(12) United States Patent
Wu et al.

(10) Patent No.: US 12,541,973 B1
(45) Date of Patent: Feb. 3, 2026

(54) FUSION NETWORK MODEL-BASED CROP YIELD INVERSION METHOD AND SYSTEM

(71) Applicant: WUHAN UNIVERSITY, Hubei (CN)

(72) Inventors: Zhaocong Wu, Hubei (CN); Ruixin Fang, Hubei (CN); Nan Xie, Hubei (CN); Kexin Wang, Hubei (CN)

(73) Assignee: WUHAN UNIVERSITY, Hubei (CN)

(*) Notice: Subject to any disclaimer, the term of this patent is extended or adjusted under 35 U.S.C. 154(b) by 0 days.

(21) Appl. No.: 19/243,631

(22) Filed: Jun. 19, 2025

(30) Foreign Application Priority Data

Sep. 3, 2024 (CN) .......................... 202411223873.9

(51) Int. Cl.
*G06V 20/10* (2022.01)
*G06V 10/82* (2022.01)

(52) U.S. Cl.
CPC ............ *G06V 20/188* (2022.01); *G06V 10/82* (2022.01)

(58) Field of Classification Search
CPC ............................... G06V 20/188; G06V 10/82
See application file for complete search history.

(56) References Cited

FOREIGN PATENT DOCUMENTS

| CN | 110728446 | | 1/2020 | |
| CN | 110728446 A | * | 1/2020 | ............ G06Q 10/04 |
| CN | 115018105 | | 9/2022 | |
| CN | 115018105 A | * | 9/2022 | ............ G06Q 50/02 |
| CN | 115860269 | | 3/2023 | |
| IN | 202411040151 | | 6/2024 | |

OTHER PUBLICATIONS

Deng; Yuanyuan et al., "Research on Object-oriented Classification of Agricultural Land Based on High Resolution Images", Remote Sensing for Land & Resources, Dec. 15, 2010, with English translation thereof, pp. 1-10, No. 4.
"Office Action of China Counterpart Application", issued on Oct. 23, 2024, with English translation thereof, p. 1-p. 9.

* cited by examiner

*Primary Examiner* — Tracy Mangialaschi
(74) *Attorney, Agent, or Firm* — JCIP GLOBAL INC.

(57) ABSTRACT

A fusion network model-based crop yield inversion method and system, the method includes: obtaining meteorological data and remote-sensing image data in a study region; building a Long Short-Term Memory-Convolutional Neural Networks (LSTM-CNN) coupling neural network model by using LSTM and CNN; performing pretraining on the LSTM by using simulation data generated by a WOFOST crop growth model, freezing LSTM layer parameters, and training the LSTM-CNN coupling neural network model based on the meteorological data and the remote-sensing image data to obtain a crop yield inversion model. In the present disclosure, by combining the advantages of the crop growth model and the neural network model, information extraction is performed on meteorological data and remote-sensing image data respectively, and feature information is fused into one feature vector. Thus, prior yield inversion information can be obtained from the meteorological data and the land plot information can be introduced.

9 Claims, 6 Drawing Sheets

FUSION NETWORK MODEL-BASED CROP YIELD INVERSION METHOD AND SYSTEM

CROSS-REFERENCE TO RELATED APPLICATION

This application claims the priority benefit of Chinese patent application No. 202411223873.9, filed on Sep. 3, 2024. The entirety of the above-mentioned patent application is hereby incorporated by reference herein and made a part of this specification.

BACKGROUND

Technical Field

The present disclosure relates to the field of crop yield measurement technologies, and in particular to a fusion network model-based crop yield inversion method and system.

Description of Related Art

In the crop management field, crop yield estimation can adjust resource investment and predict the price tendency of the crops. It is a method of performing pricing decision in advance and effectively increasing incomes as well as an effective approach to reducing resource wastes, and improving the agricultural product quality, arable land productivity and agricultural production efficiency. Furthermore, high-accuracy yield estimation can optimize the spatial planting layout of the crops, intensify the production management of the crops and further exert the land production potential.

At the current stage, the causes and essence of the crop growth and development are usually revealed by simulating a crop growth process using environmental factors based on a crop growth model. However, when the crop growth model develops from single-point study to region-scale application, there may appear the non-uniformity problem of land surface and near land surface environments due to increase in spatial scale, leading to many difficulties in acquisition of some macro data and regionalization of parameters in the model. The simulation results of the model also have a high degree of uncertainty. Study is carried out on the model adaptation of combination of the crop growth model and neural network to find out a method of simulating the crop growth model by the neural network, which not only reflects the crop growth and development process but also improves the generalization of the model by using the powerful transfer learning capability of deep learning, helping realize advantage complementation and improve application potential. In addition, the existing remote-sensing technologies for crop estimation still have some problems. For example, the sources of the high-resolution remote-sensing data are insufficient, the usage costs are high, and the pure empirical estimation model is only applicable to small-scope study region and are difficult to promote to large-area yield estimation. The data as model input source usually also involves meteorological data, the spatial resolution of which is often low. In fact, the meteorological environment within a large spatial scope does not have noticeable change. But each farmland plot has a different yield in unit area. Therefore, in order to carry out crop yield inversion of higher spatial resolution, it is necessary to introduce land plot information. The remote-sensing images are ideal data for providing the land plot information. However, the input data of the existing World Food STudies (WOFOST) crop growth model is fixed, and the remote-sensing image data cannot be input. This model is a crop growth model developed by the Center of World Food Studies (CWFS) and Netherlands Wageningen University and a dynamic interpretive model for simulating the growth of the annual crops under specific soils and climatic conditions. This model stresses quantitative land evaluation, regional yield forecast, risk analysis, and quantitative application of the influence of the inter-annual yield change and climatic change.

Therefore, it is required to propose a new model for crop yield estimation to effectively solve the above problems.

SUMMARY

The present disclosure provides a fusion network model-based crop yield inversion method and system to solve the defects of limited adaptation range of data source, low model generalization and low result accuracy of the crop growth model for crop yield estimation in the prior arts.

According to a first aspect, the present disclosure provides a fusion network model-based crop yield inversion method, comprising:
  obtaining meteorological data and remote-sensing image data in a study region;
  building a Long Short-Term Memory-Convolutional Neural Networks (LSTM-CNN) coupling neural network model by using LSTM and CNN;
  performing pretraining on the LSTM by using simulation data generated by a WOFOST crop growth model, freezing LSTM layer parameters, and training the LSTM-CNN coupling neural network model based on the meteorological data and the remote-sensing image data to obtain a crop yield inversion model;
  inputting the meteorological data and the remote-sensing image data of a target region into the crop yield inversion model to obtain a crop yield inversion result of the target region.

According to the fusion network model-based crop yield inversion method, wherein obtaining the meteorological data and the remote-sensing image data in the study region comprises:
  determining multiple target boxes in the study region;
  by using a large vision model SAM, segmenting land plots in the multiple target boxes and determining central point coordinates corresponding to the multiple target boxes;
  based on the central point coordinates, obtaining the meteorological data and the remote-sensing image data released by the climate change service center.

According to the fusion network model-based crop yield inversion method, wherein the meteorological data comprises solar irradiance, maximum temperature, minimum temperature, wind velocity, air pressure, and rainfall, and the solar irradiance, the maximum the temperature, the minimum temperature, the wind velocity, the air pressure, and the rainfall form a multi-dimensional meteorological matrix;
  the remote-sensing image data comprises R channel image data, G channel image data, B channel image data, and the R channel image data, the G channel image data, the B channel image data form a multi-dimensional remote-sensing matrix.

According to the fusion network model-based crop yield inversion method, wherein building the LSTM-CNN coupling neural network model by using the LSTM and CNN comprises:

determining the LSTM comprises LSTM input layer, one-dimensional convolutional layer, batch normalization layer and LSTM output layer, which are sequentially connected to each other;
  determining the CNN comprises CNN input layer, CNN layer and fully-connected layer, which are sequentially connected to each other, wherein the CNN layer comprises two stacking layers, which are sequentially connected to each other, and each stacking layer comprises one two-dimensional convolutional layer and one maximum pooling layer;
  inputting the meteorological data into the LSTM to obtain an LSTM output vector and inputting the remote-sensing image data into the CNN to obtain a CNN output vector;
  combining the LSTM output vector and the CNN output vector to obtain a fusion feature vector;
  inputting the fusion feature vector into the entire fully-connected layer to obtain an output result of the coupling neural network model.

According to the fusion network model-based crop yield inversion method, wherein determining the LSTM comprises LSTM input layer, one-dimensional convolutional layer, batch normalization layer and LSTM output layer, which are sequentially connected to each other, comprises:
  unfolding and inputting, by the LSTM input layer, the meteorological data based on multi-dimensional meteorological matrix into the one-dimensional convolutional layer;
  performing, by the one-dimensional convolutional layer, information extraction on the meteorological data in time dimension to obtain meteorological extraction time information, wherein the convolutional layer comprises same input channel number and output channel number;
  performing, by the batch normalization layer, normalization on the meteorological extraction time information and outputting a normalization result to the LSTM layer;
  flattening, by the LSTM layer, the normalization result to the LSTM output vector, wherein a number of hidden neurons in the LSTM layer corresponds to a number of dimensions of the output channel number of the convolutional layer.

According to the fusion network model-based crop yield inversion method, wherein it is determined that the CNN comprises-CNN input layer, CNN layer and fully-connected layer, which are sequentially connected to each other, wherein the CNN layer comprises two stacking layers, which are sequentially connected to each other, and each stacking layer comprises one two-dimensional convolutional layer and one maximum pooling layer, which comprises:
  resampling, by the CNN input layer, the remote-sensing image data to a preset size and normalizing to a tensor;
  inputting the tensor to the CNN layer, wherein the output channel number of the first two-dimensional convolutional layer of the CNN layer is equal to the input channel number of the second two-dimensional convolutional layer, and convolutional kernels are same in size, and the maximum pooling layer of each stacking layer has same number of kernels;
  inputting an output result of the CNN layer to the fully-connected layer to obtain the CNN output vector.

According to the fusion network model-based crop yield inversion method, wherein based on the simulation data generated by the WOFOST crop growth model, pre-training is performed on the LSTM, and LSTM layer parameters are frozen; based on the meteorological data and the remote-sensing image data, the LSTM-CNN coupling neural network model is trained to obtain a crop yield inversion model, which comprises:
  obtaining the simulation data and loading the simulation data into the LSTM of the LSTM-CNN coupling neural network model;
  freezing the LSTM layer parameters of the LSTM to stop the update of the LSTM layer parameters in the training process;
  based on preset training period, batch size, preset loss function and gradient optimization method, training the LSTM-CNN coupling neural network model by using sample data formed by the meteorological data, and the remote-sensing image data until the model satisfies preset convergence conditions, and stopping training and storing the current trained model as the crop yield inversion model.

According to a second aspect, the present disclosure further provides a fusion network model-based crop yield inversion system, comprising:
  an obtaining module, configured to obtain meteorological data and remote-sensing image data in a study region;
  a building module, configured to build a Long Short-Term Memory-Convolutional Neural Networks (LSTM-CNN) coupling neural network model by using LSTM and CNN;
  a training module, configured to perform pretraining on the LSTM by using simulation data generated by a WOFOST crop growth model, freeze LSTM layer parameters, and train the LSTM-CNN coupling neural network model based on the meteorological data and the remote-sensing image data to obtain a crop yield inversion model;
  an inversion module, configured to input the meteorological data and the remote-sensing image data of a target region into the crop yield inversion model to obtain a crop yield inversion result of the target region.

According to a third aspect, the present disclosure further provides an electronic device, comprising a memory, a processor and computer programs stored on the memory and run on the processor, wherein the processor executes the programs to perform any one of the above the fusion network model-based crop yield inversion methods.

According to a fourth aspect, the present disclosure further provides a non-transitory computer readable storage medium on which computer programs are stored, where the computer programs are executed by a processor to perform any one of the above the fusion network model-based crop yield inversion methods.

The technical solution provided by the present disclosure brings at least the following beneficial effects.

In the fusion network model-based crop yield inversion method and system provided by the present disclosure, by combining the advantages of the crop growth model and the neural network model, information extraction is performed on meteorological data and remote-sensing image data respectively, and feature information is fused into individual feature vectors. Thus, prior yield inversion information can be obtained from the meteorological data and the land plot information can be introduced to realize the crop yield inversion of higher spatial resolution.

BRIEF DESCRIPTION OF THE DRAWINGS

In order to more clearly describe the technical solutions in the present disclosure or in the prior arts, the drawings required for descriptions of the embodiments or the prior arts will be briefly introduced. Apparently, the drawings described hereunder are some embodiments of the present disclosure. Those skilled in the arts can also obtain other drawings based on these drawings without carrying out creative work.

DETAILED DESCRIPTIONS OF THE EMBODIMENTS

In order to make the objects, technical solutions and advantages of the present disclosure clearer, the technical solutions of the present disclosure will be fully and clearly described below in combination with the drawings of the present disclosure. Apparently, the embodiments described hereunder are merely some embodiments of the present disclosure rather than all embodiments. All other embodiments obtained by those skilled in the arts based on these embodiments in the present disclosure without carrying out creative work shall fall within the scope of protection of the present disclosure.

For the shortcomings of the prior arts, the present disclosure provides a network model-based crop yield inversion method to combine a crop growth model and a neural network model, fuse meteorological data and remote-sensing image data and utilize the mechanism of a WOFOST model so as to realize the inversion of the crop yield.

Figure 1:
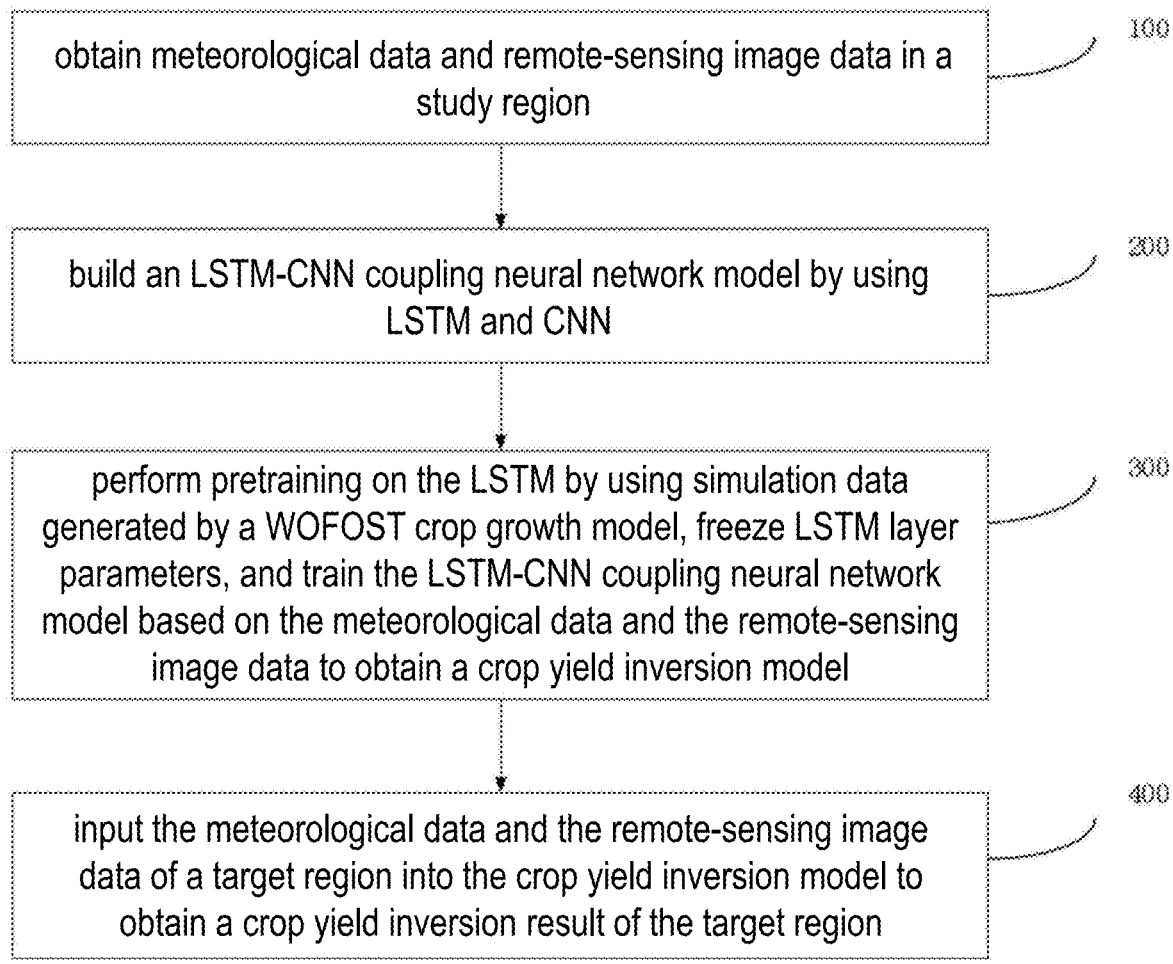
FIG. 1 is a first flowchart illustrating a fusion network model-based crop yield inversion method according to the present disclosure.

FIG. 1 is a first flowchart illustrating a fusion network model-based crop yield inversion method according to an embodiment of the present disclosure. This method includes the following steps as shown in FIG. 1.

At step 100, meteorological data and remote-sensing image data in a study region are obtained.

At step 200, a Long Short-Term Memory-Convolutional Neural Networks (LSTM-CNN) coupling neural network model is built using LSTM and CNN.

At step 300, based on simulation data generated by a WOFOST crop growth model, pre-training is performed on the LSTM, and LSTM layer parameters are frozen; based on the meteorological data and the remote-sensing image data, the LSTM-CNN coupling neural network model is trained to obtain a crop yield inversion model.

At step 400, the meteorological data and the remote-sensing image data in a target region are input into the crop yield inversion model to obtain a crop yield inversion result of the target region.

Figure 2:
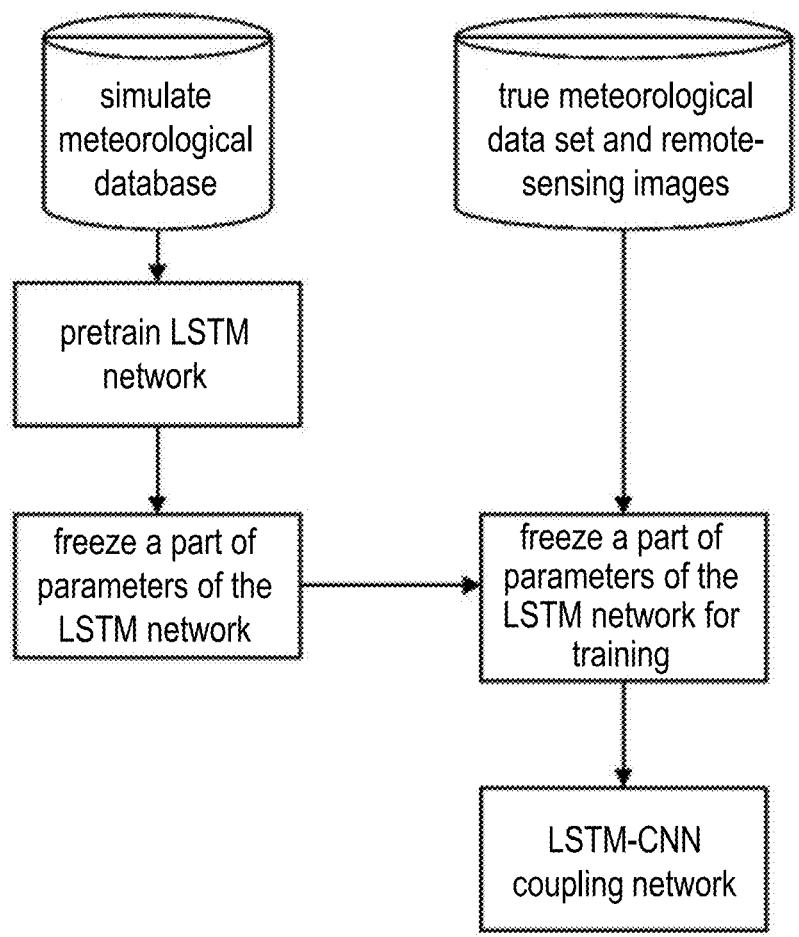
FIG. 2 is a second flowchart illustrating a fusion network model-based crop yield inversion method according to the present disclosure.

Specifically, as shown in FIG. 2, an embodiment of the present disclosure provides an LSTM-CNN combining the meteorological data and the remote-sensing image data.

Firstly, the meteorological data and the remote-sensing image data in the study region are obtained, and then the LSTM-CNN coupling neural network model is built, and a part of parameters of the LSTM network are frozen. This part of parameters are realized by pre-training the LSTM network through simulation of meteorological database and frozen. Further, by using the obtained true meteorological data and remote-sensing images, the LSTM-CNN coupling neural network model with the frozen part of parameters of the LSTM network is trained and after the training, the crop yield inversion model is obtained. Finally, in the practical applications, the meteorological data and the remote-sensing image data in the target region are input into the trained crop yield inversion model to obtain the crop yield inversion result of the target region.

In the present disclosure, by combining the advantages of the crop growth model and the neural network model, information extraction is performed on the meteorological data and the remote-sensing image data respectively, and feature information is fused into individual feature vectors. Thus, prior yield inversion information can be obtained from the meteorological data and the land plot information can be introduced to realize the crop yield inversion of higher spatial resolution.

In some embodiments, obtaining the meteorological data and the remote-sensing image data in the study region includes:

determining multiple target boxes in the study region;
by using a large vision model SAM, segmenting the land plots in the multiple target boxes and determining central point coordinates corresponding to the multiple target boxes;
based on the central point coordinates, obtaining the meteorological data and the remote-sensing image data released by the climate change service center.

Figure 3:
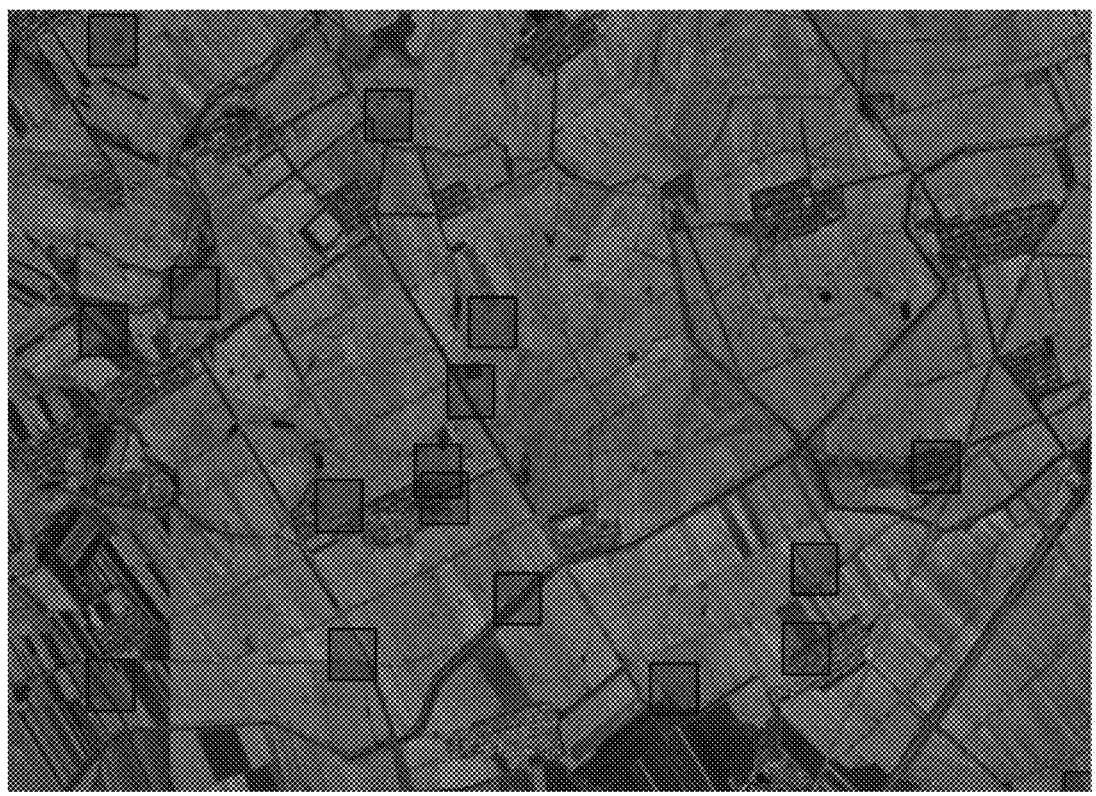
FIG. 3 is a schematic diagram of selecting target boxes for sampling at the time of data acquisition according to the present disclosure.

Specifically, in an embodiment of the present disclosure, an experimental region is selected and target boxes are selected in the experimental region. A generation result of the target boxes is as shown in FIG. 3. For example, in a province, seven counties are selected as experimental region, and 1000 sampling points are selected randomly in the experimental region to obtain 1000 longitude-latitude coordinates. Then with these coordinates as central points, 1000 target boxes of about 1000 m×1000 m are selected.

Figure 4:
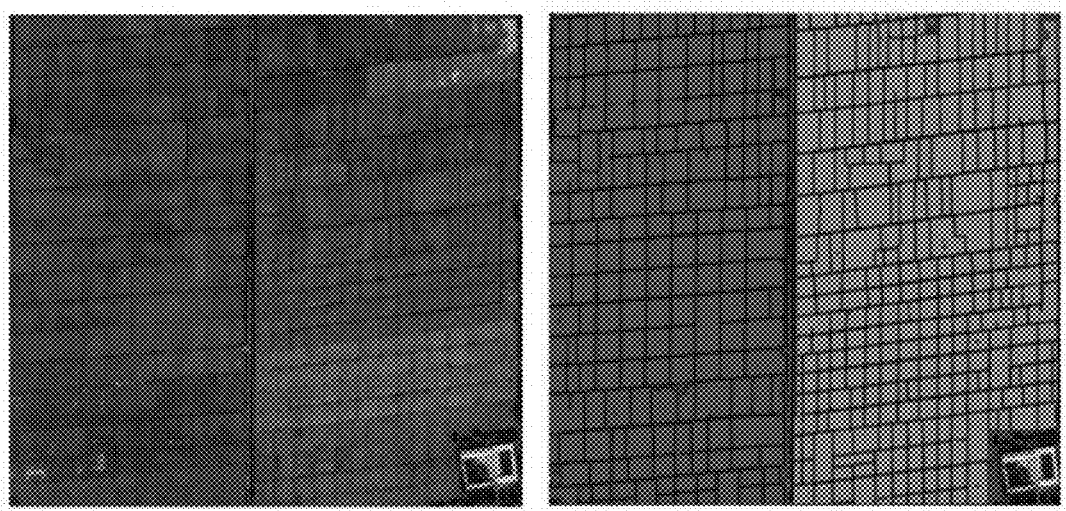
FIG. 4 is a schematic diagram of segmenting a land plot based on SAM model according to the present disclosure.

In the target boxes, the land plot is divided using the large vision model Segment Anything Model (SAM), with a division result shown in FIG. 4. In this case, each land plot has one central point coordinate by which meteorological data disclosed by the Copernicus Climate Change Service (C3S) and remote-sensing image data provided by Google are downloaded from the Google Earth Engine and then pre-processed to obtain a meteorological data set required for the method, which includes the meteorological data such as solar irradiance I, maximum temperature Tmax, minimum temperature Tmin, wind velocity v, air pressure P, and rainfall R and the like and the remote-sensing image data corresponding to the land plots. The solar irradiance I, the maximum temperature Tmax, the minimum temperature Tmin, the wind velocity v, the air pressure P, and the rainfall R respectively correspond to the Input1-6 downloading day-frequency meteorological data of the Weather Data Inputs in the FIG. 2, that is, each type of meteorological data corresponding to each land plot is one vector, including the solar irradiance I, the maximum temperature Tmax, the minimum temperature Tmin, the wind velocity v, the air pressure P, and the rainfall R totaling 6 types of meteorological data. The Input1-6 of each land plot is one matrix. The downloaded remote-sensing image data has three channels R, G, and B, which also can form a matrix.

In some embodiments, building the LSTM-CNN coupling neural network model by using LSTM and CNN includes:

determining the LSTM includes LSTM input layer, one-dimensional convolutional layer, batch normalization layer and LSTM output layer, which are sequentially connected to each other;

determining the CNN includes CNN input layer, CNN layer and fully-connected layer, which are sequentially connected to each other, where the CNN layer includes two stacking layers, which are sequentially connected to each other, and each stacking layer includes one two-dimensional convolutional layer and one maximum pooling layer;

inputting the meteorological data into the LSTM to obtain an LSTM output vector and inputting the remote-sensing image data into the CNN to obtain a CNN output vector;

combining the LSTM output vector and the CNN output vector to obtain a fusion feature vector;

inputting the fusion feature vector into the entire fully-connected layer to obtain an output result of the coupling neural network model.

Figure 5:
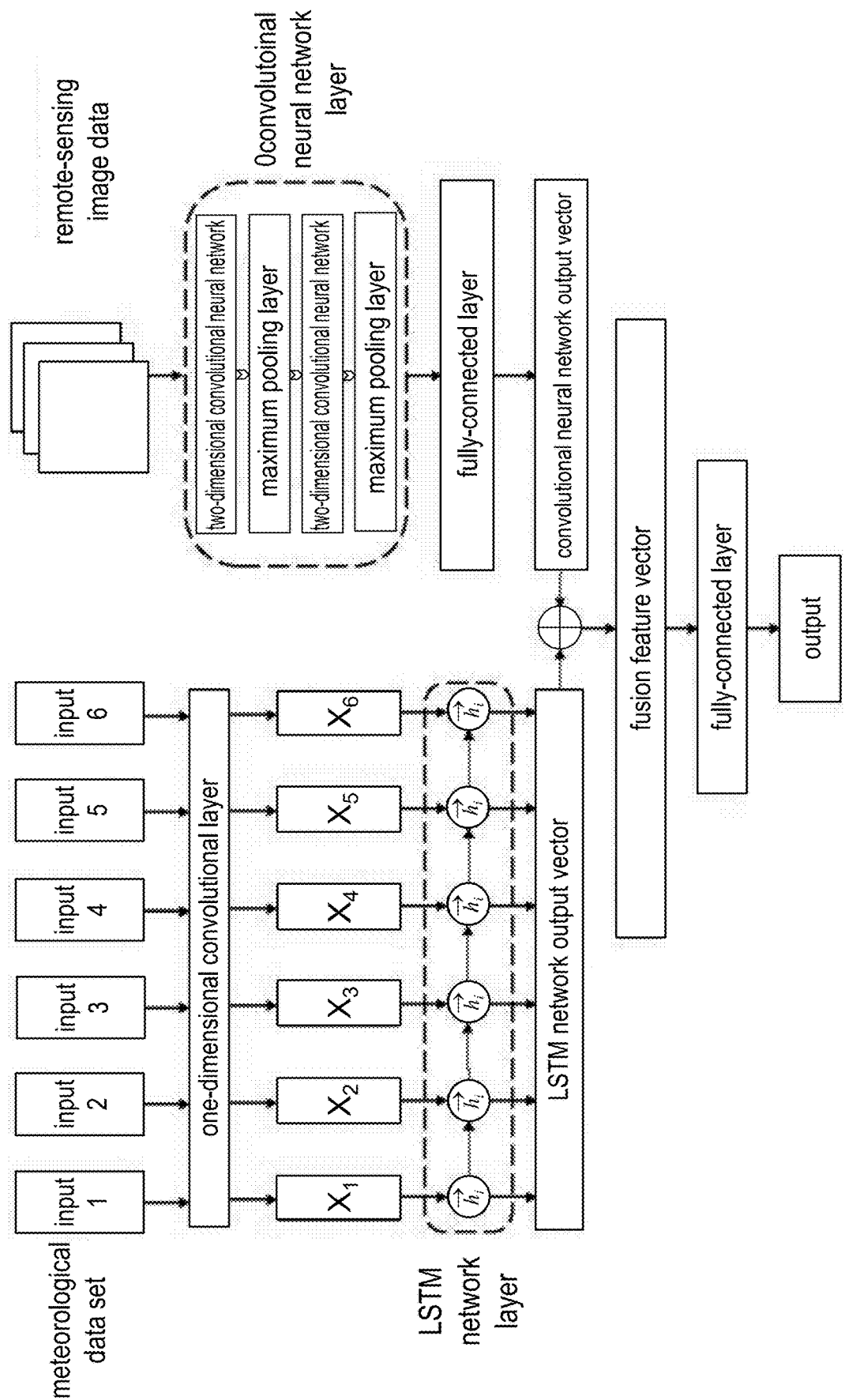
FIG. 5 is a framework diagram illustrating a Long Short-Term Memory-Convolutional Neural Networks (LSTM-CNN) neural network according to the present disclosure.

Specifically, as shown in FIG. 5, it shows a structural diagram of an LSTM-CNN coupling neural network model provided by an embodiment of the present disclosure.

In the first part, the LSTM is built, where the LSTM includes one input layer; the meteorological data set Input 1-6 is input, and then information extraction is performed on the meteorological data in time dimension through one Conv1d convolutional layer, one-dimensional convolutional layer. The input channel number of the Conv1d convolutional layer is 6, the output channel number is 6, the convolutional kernel size is 10 and the stride is 5. Through the convolutional layer, the size is changed into 72×6; the convolutional layer is followed by one batch normalization layer to obtain the vectors X1 to X6 by processing. Then, the output result is input into the LSTM network layer, and the number of hidden neurons of the LSTM network layer is set as corresponding to the number of dimensions output by the convolutional layer, and in this embodiment, is set to 72. Then, the output result is flattened to one long vector, namely, the LSTM network output vector in FIG. 5.

In the second part, the CNN is built, where the CNN includes one input layer for inputting the remote-sensing image data. Before input, the remote-sensing image data is preprocessed. The image size is resampled to 32×32 in a unified way and converted into tensor through normalization processing. Then, it is input into one Conv2d convolutional layer, namely, a two-dimensional convolutional neural network layer. The input channel number of the two-dimensional convolutional neural network layer is 3, the output channel number is 6, the convolutional kernel size is 3×3, the stride is 2 and the padding is 2. In this way, a tensor with the shape of (6, 16, 16) is obtained, and then goes through one maximum pooling layer. The kernel size of the maximum pooling layer is (2, 2), the stride is 2, and the padding is 0. Then, it is input into one Conv2d convolutional layer. The input channel number of the Conv2d convolutional layer is 6, the output channel number is 1, the size of the convolutional kernel is 3×3, the stride is 1, and the padding is 2. Then, it goes through one maximum pooling layer. The kernel size of the maximum pooling layer is set to (2, 2), the stride is 2, and the padding is 2. Finally, it is input into one fully-connected layer to obtain the output result of the CNN, namely, the convolutional neural network output vector in FIG. 5.

In the third part, the obtained LSTM network output vector and convolutional neural network output vector are combined into one vector by fusion, that is, into the fusion feature vector in FIG. 5.

In the fourth part, the obtained fusion feature vector is input into one fully-connected layer to obtain a final output result of the network model.

In some embodiments, based on the simulation data generated by the WOFOST crop growth model, pre-training is performed on the LSTM and the LSTM layer parameters are frozen; based on the meteorological data and the remote-sensing image data, the LSTM-CNN coupling neural network model is trained to obtain the crop yield inversion model, which includes:

obtaining the simulation data and loading the simulation data into the LSTM of the LSTM-CNN coupling neural network model;

freezing the LSTM layer parameters of the LSTM to stop the update of the LSTM layer parameters in the training process;

based on preset training period, batch size, preset loss function and gradient optimization method, training the LSTM-CNN coupling neural network model by using sample data formed by the meteorological data and the remote-sensing image data until the model satisfies preset convergence conditions, and stopping training and storing the current trained model as the crop yield inversion model.

Specifically, in the embodiments of the present disclosure, performing training on the LSTM-CNN coupling neural network model includes the following steps:

before training, the pretraining parameters of the LSTM network model are loaded, where the pretraining parameters are obtained by pretraining with simulation data; after the parameters are loaded, the parameters of the LSTM layer (i.e. the parameters of the LSTM network layer in FIG. 5) are frozen; in the subsequent training, this part of parameters are no longer updated.

It should be noted that the above simulation data is obtained by the WOFOST crop growth model, which specifically includes the steps as below:

(1) Crop Development Stage

In the WOFOST model, the phenology is described by dimensionless state Variable Development Stage (DVS). For most annual crops, the DVS is set to 0 at the time of seedling coming out, and to 1 at the time of blossoming and to 2 at the time of maturity. In the WOFOST, the phonological development is calculated by increasing the development stage by the development rate on each time stride:

The development rate DVR is calculated as below:

$$DVR = \frac{T_e}{T_{req}}$$

where $T_e$ refers to a daily effective temperature, $T_{req}$ refers to a total cumulative temperature required for next development stage, which is valued based on different $T_{req}$ of the growth stage, namely, the TSUM1 and TSUM2 in the input parameters of the WOFOST.

DVS is the accumulation of the DVR on the effective sunlight time:

$$DVS = \frac{L-L_0}{L_0-L_\varepsilon}DVR$$

where L refers to a sunlight time length, $L_0$ refers to the most adaptive sunlight time length, and $L_\varepsilon$ refers to the least sunlight time length.

(2) Respiration and Dry Matter Accumulation

The daily total assimilation rate of the crops is calculated by the absorbed radiation and the photosynthetic response curve of the leaf. The response depends on the temperature. The absorbed radiation is calculated based on total incident radiation and leaf area. Since the response of the photosynthesis to the illumination intensity is nonlinear, it is required to consider the change of the radiation level. The effective radiation quantity absorbed by the leaf area can be calculated in the following formula:

$$I_f = (1-\rho) \cdot I_0 \cdot e^{-kL}$$

where $I_f$ refers to a net radiation of the leaf layer f, $\rho$ is a reflection coefficient, $I_0$ is a radiation level of a crop canopy in sunny day, k is an extinction coefficient, and L is a leaf area index.

The light absorbed by the leaf layer can be calculated in the following formula:

$$I_{af} = k \cdot I_f$$

where $I_{af}$ refers to the radiation absorbed by the leaf layer f.

The maximum total assimilation rate can be calculated in the following formula:

$$A_L = A_m \cdot (1 - e^{-\varepsilon \cdot I_{af}/A_m})$$

where $A_L$ is a total assimilation rate, $A_m$ is a maximum assimilation rate, and $\varepsilon$ is an original light energy utilization rate of the single leaf.

(3) Dry Matter Allocation

After the crops respire, the dry matter generated by each organ is reallocated. By the allocation of the dry matter, the matter accumulated by the crop and the nutrients contained therein can be known in details. The allocation of the dry matter W is shown in the following formula:

$$W = C \cdot (A_d - A_{m,t})$$

where C is an allocation coefficient, $A_d$ is a daily assimilation rate, $A_{m,t}$ is a respiration rate of the crops under true temperature or simulation temperature; in the dry matter allocation of the crops, allocation is made to different organs of the crops at different fractions. The dry matter allocation of the model includes above-ground dry matter $W_{Above}$ and under-ground dry matter $W_{RT}$.

$$W_{Above} = (1-FR) \cdot W$$

$$W_{RT} = FR \cdot W$$

where FR is a dry matter allocation coefficient for allocation to the root, namely, the FRTB parameter in the input parameters of the WOFOST.

The above-ground dry matter $W_{Above}$ is allocated to different organs of the crops:

$$W_{LV} = FL^* \cdot (1-FR) \cdot W_{Above}$$

$$W_{SO} = FO^* \cdot (1-FR) \cdot W_{Above}$$

$$W_{ST} = FS^* \cdot (1-FR) \cdot W_{Above}$$

where $W_{LV}$ is a dry matter allocation to the leaf of the crops, $W_{SO}$ is a dry matter allocation to the stem of the crops, $W_{ST}$ is a dry matter allocation to the storage organ of the crops, FL*, FO* and FS* are allocation coefficients with their sum being 1.

When the growth stage reaches to full maturity, namely, DVS=2, $W_{ST}$ is a desired simulation production value.

When the production simulation is performed by using the WOFOST model in practices, it is required to set various parameters. For further model training, the upper limit of the training period epochs is set to 300, the batch size is set to 32, the loss function is Mean-Square Error (MSE), the gradient optimization method is Adam optimization method, the Adam initial learning rate parameter is set to 0.001, and the momentum parameter is set to 0.09. Training samples are input into the set LSTM-CNN coupling neural network model for training. When the value loss of the loss function does not improve any longer in 10 successive training periods, the training is stopped and the model is stored to obtain the trained crop yield inversion model.

It can be understood that the input data of the existing WOFOST crop growth model is fixed and the image data cannot be input. But, in the present disclosure, the WOFOST model is learned by the neural network into the network parameters, and then combined with another image input neural network, which is equivalent to introducing the image information into the WOFOST model. In the present disclosure, by effectively combining the advantages of the crop growth model and the neural network model, information extraction is performed on the meteorological data and the remote-sensing image data respectively, and feature information is fused into individual feature vectors. Thus, prior yield inversion information can be obtained from the meteorological data and the land plot information can also be introduced to realize the crop yield inversion of higher spatial resolution.

Descriptions are made below to a network model-based crop yield inversion system provided by the present disclosure. For the below-mentioned network model-based crop yield inversion system, reference can be made to the corresponding parts of the above-mentioned network model-based crop yield inversion method.

Figure 6:
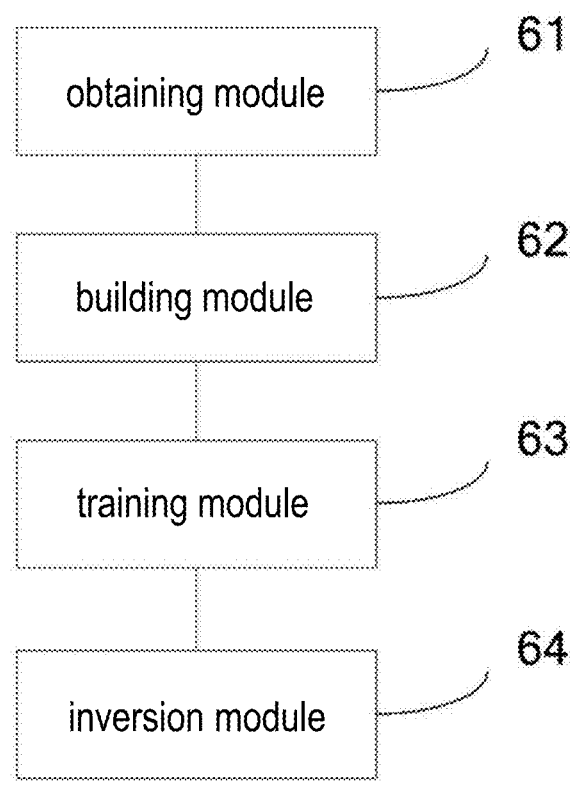
FIG. 6 is a structural schematic diagram illustrating a fusion network model-based crop yield inversion system according to the present disclosure.

FIG. 6 is a structural schematic diagram illustrating the fusion network model-based crop yield inversion system according to an embodiment of the present disclosure. As shown in FIG. 6, the system includes an obtaining module 61, a building module 62, a training module 63 and an inversion module 64.

The obtaining module 61 is configured to obtain meteorological data and remote-sensing image data in a study region; the building module 62 is configured to build a Long Short-Term Memory-Convolutional Neural Networks (LSTM-CNN) coupling neural network model by using LSTM and CNN; the training module 63 is configured to perform pretraining on the LSTM by using simulation data generated by a WOFOST crop growth model, freeze LSTM layer parameters, and train the LSTM-CNN coupling neural network model based on the meteorological data and the remote-sensing image data to obtain a crop yield inversion model; the inversion module 64 is configured to input the meteorological data and the remote-sensing image data of a target region into the crop yield inversion model to obtain a crop yield inversion result of the target region.

Figure 7:
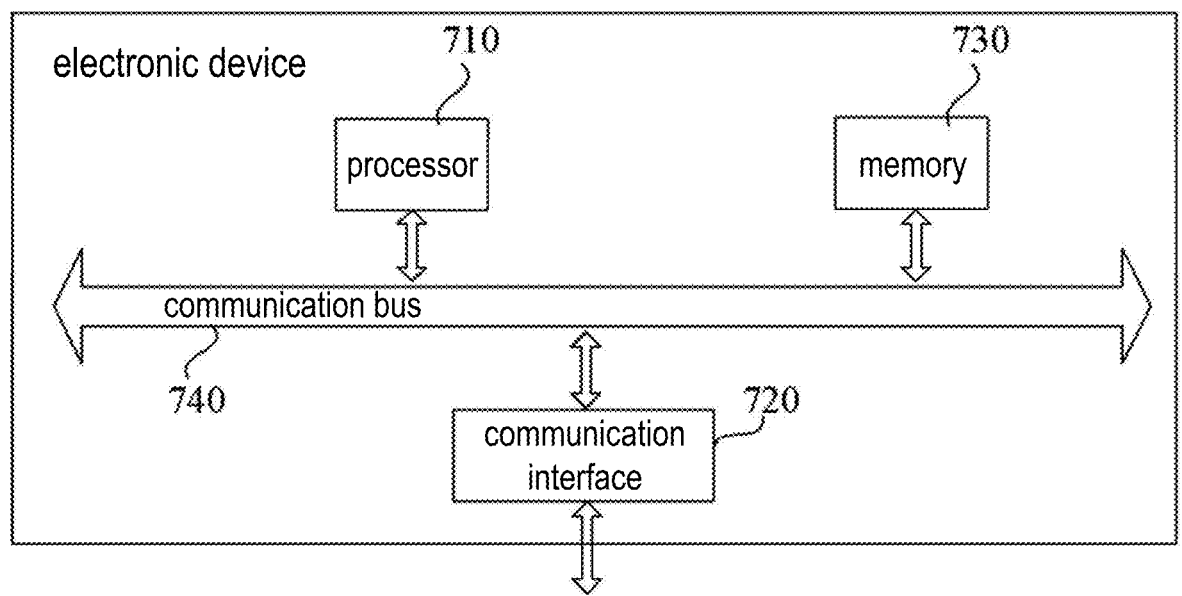
FIG. 7 is a structural schematic diagram of an electronic device according to the present disclosure.

FIG. 7 exemplifies a schematic diagram of a physical structure of an electronic device. As shown in FIG. 7, the electronic device may include a processor 710, a communication interface 720, a memory 730 and a communication bus 740. Communication is performed among the processor 710, the communication interface 720 and the memory 730 via the communication bus 740. The processor 710 can invoke logic instructions in the memory 730 to execute the fusion network model-based crop yield inversion method. The method includes: obtaining meteorological data and remote-sensing image data in a study region; building a Long Short-Term Memory-Convolutional Neural Networks (LSTM-CNN) coupling neural network model by using LSTM and CNN; performing pretraining on the LSTM by using simulation data generated by a WOFOST crop growth model, freezing LSTM layer parameters, and training the LSTM-CNN coupling neural network model based on the meteorological data and the remote-sensing image data to obtain a crop yield inversion model; inputting the meteorological data and the remote-sensing image data of a target region into the crop yield inversion model to obtain a crop yield inversion result of the target region.

Furthermore, when the logic instructions in the above memory 730 are implemented in the form of software function unit and sold or used as independent product, they can be stored in one computer-readable storage medium. Based on the understanding, the technical solution of the present disclosure essentially or the part contributing to the prior arts or the part of the technical solution can be embodied in the form of software product. The computer software product is stored in one storage medium, including multiple instructions to enable one computer device (may be personal computer, server, or network device or the like) to perform all or part of the steps of the method in each embodiment of the present disclosure. The above storage medium includes U flash drive, removable harddisk, Read-Only Memory (ROM), Random Access Memory (RAM), magnetic diskette or compact disk and other mediums storing program codes.

On the other hand, the present disclosure further provides a non-transitory computer readable storage medium, storing computer programs thereon. The computer programs are executed by a processor to perform the fusion network model-based crop yield inversion method provided by each embodiment of the present disclosure. The method includes: obtaining meteorological data and remote-sensing image data in a study region; building a Long Short-Term Memory-Convolutional Neural Networks (LSTM-CNN) coupling neural network model by using LSTM and CNN; performing pretraining on the LSTM by using simulation data generated by a WOFOST crop growth model, freezing LSTM layer parameters, and training the LSTM-CNN coupling neural network model based on the meteorological data and the remote-sensing image data to obtain a crop yield inversion model; inputting the meteorological data and the remote-sensing image data of a target region into the crop yield inversion model to obtain a crop yield inversion result of the target region.

The above-described apparatus embodiments are merely illustrative and the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those skilled in the arts can understand and practice it without carrying out creative work.

It may be known from descriptions of the above embodiments that persons skilled in the arts may clearly understand that the embodiments of the present disclosure may be implemented by means of software and a necessary general hardware platform and of course, can also be implemented by hardware. Based on such understanding, the technical solutions of embodiments of the present disclosure essentially or a part contributing to the prior art may be embodied in the form of a software product, and the computer software product may be stored in a storage medium, such as a ROM/RAM, a diskette or a compact disk, and include several instructions for enabling a computer device (such as a personal computer, a server or a network device) to perform the methods of different embodiments or some parts of the embodiments of the present disclosure.

Finally, it should be noted that the above embodiments are merely used to describe the technical solutions of the present disclosure rather than limit the present disclosure. Although detailed descriptions are made to the present disclosure by referring to the preceding embodiments, those skilled in the art should understand that any person of this prior art may still make modifications to the technical solutions recorded in the above embodiments or make equivalent substitutions to part or all of technical features therein. Such modifications or substitutions will not cause the corresponding technical solutions to depart from the spirit and scope of the technical solutions of the embodiments of the present disclosure.

What is claimed is:

1. A fusion network model-based crop yield inversion method, comprising:

obtaining meteorological data and remote-sensing image data in a study region;

building a Long Short-Term Memory-Convolutional Neural Network (LSTM-CNN) coupling neural network model by using Long Short-Term Memory (LSTM) and Convolutional Neural Network (CNN);

performing pretraining on the LSTM by using simulation data generated by a World Food Studies (WOFOST) crop growth model, freezing LSTM layer parameters, and training the LSTM-CNN coupling neural network model based on the meteorological data and the remote-sensing image data to obtain a crop yield inversion model;

inputting the meteorological data and the remote-sensing image data of a target region into the crop yield inversion model to obtain a crop yield inversion result of the target region; wherein, building the LSTM-CNN coupling neural network model by using the LSTM and the CNN comprises:

determining the LSTM comprises an LSTM input layer, a one-dimensional convolutional layer, a batch normalization layer and an LSTM output layer, which are sequentially connected to each other, wherein:

the LSTM input layer unfolds and inputs the meteorological data based on a multi-dimensional meteorological matrix into the one-dimensional convolutional layer;

the one-dimensional convolutional layer performs information extraction on the meteorological data in time dimension to obtain meteorological extraction time information, wherein the one-dimensional convolutional layer comprises same input channel number and output channel number;

the batch normalization layer performs normalization on the meteorological extraction time information and outputs a normalization result to a LSTM network layer; and the LSTM network layer flattens the normalization result to an LSTM output vector, wherein a number of hidden neurons in the LSTM network layer corresponds to a number of dimensions of the output channel number of the one-dimensional convolutional layer;

determining the CNN comprises a CNN input layer, a CNN layer and a fully-connected layer, which are sequentially connected to each other, wherein the CNN layer comprises two stacking layers, which are sequentially connected to each other, and each of the stacking layers comprises a two-dimensional convolutional layer and a maximum pooling layer, wherein the CNN input layer resamples the remote-sensing image data to a preset size and normalizes the remote-sensing image data to a tensor;

the tensor is input to the CNN layer, wherein an output channel number of a first two-dimensional convolutional layer of the CNN layer is equal to an input channel number of a second two-dimensional convolutional layer, and convolutional kernels are same in size, and the maximum pooling layer of each of the stacking layers has same number of kernels; and an output result of the CNN layer is input to the fully-connected layer to obtain a CNN output vector;

inputting the meteorological data into the LSTM to obtain the LSTM output vector, and inputting the remote-sensing image data into the CNN to obtain the CNN output vector;

combining the LSTM output vector and the CNN output vector to obtain a fusion feature vector;

inputting the fusion feature vector into the fully-connected layer to obtain an output result of the coupling neural network model; and which training the LSTM-CNN coupling neural network mode comprises:

obtaining the simulation data and loading the simulation data into the LSTM of the LSTM-CNN coupling neural network model;

freezing the LSTM layer parameters of the LSTM to stop updating the LSTM layer parameters in a training process;

based on a preset training period, a batch size, a preset loss function and a gradient optimization method, training the LSTM-CNN coupling neural network model by using sample data formed by the meteorological data and the remote-sensing image data until the LSTM-CNN coupling neural network model satisfies preset convergence conditions, and stopping training and storing the trained LSTM-CNN coupling neural network model as the crop yield inversion model.

2. The fusion network model-based crop yield inversion method according to claim 1, wherein obtaining the meteorological data and the remote-sensing image data in the study region comprises:

determining a plurality of target boxes in the study region;

by using a large vision model Segment Anything Model (SAM), segmenting plots in the plurality of target boxes, and determining central point coordinates corresponding to the plurality of target boxes;

based on the central point coordinates, obtaining the meteorological data and the remote-sensing image data released by a climate change service center.

3. The fusion network model-based crop yield inversion method according to claim 2, wherein the meteorological data comprises solar irradiance, maximum temperature, minimum temperature, wind velocity, air pressure, and rainfall, and the solar irradiance, the maximum temperature, the minimum temperature, the wind velocity, the air pressure, and the rainfall form the multi-dimensional meteorological matrix;

the remote-sensing image data comprises R channel image data, G channel image data, B channel image data, and the R channel image data, the G channel image data, the B channel image data form a multi-dimensional remote-sensing matrix.

4. An electronic device, comprising a memory, a processor and computer programs stored on the memory and run on the processor, wherein the processor executes the computer programs to perform the fusion network model-based crop yield inversion method according to claim 1.

5. A non-transitory computer readable storage medium, storing computer programs thereon, wherein the computer programs are executed by a processor to perform the fusion network model-based crop yield inversion method according to claim 1.

6. An electronic device, comprising a memory, a processor and computer programs stored on the memory and run on the processor, wherein the processor executes the computer programs to perform the fusion network model-based crop yield inversion method according to claim 2.

7. An electronic device, comprising a memory, a processor and computer programs stored on the memory and run on the processor, wherein the processor executes the computer programs to perform the fusion network model-based crop yield inversion method according to claim 3.

8. A non-transitory computer readable storage medium, storing computer programs thereon, wherein the computer programs are executed by a processor to perform the fusion network model-based crop yield inversion method according to claim 2.

9. A non-transitory computer readable storage medium, storing computer programs thereon, wherein the computer programs are executed by a processor to perform the fusion network model-based crop yield inversion method according to claim 3.

* * * * *